(12) United States Patent
Blais et al.

(10) Patent No.: US 6,443,880 B2
(45) Date of Patent: Sep. 3, 2002

(54) ARRANGEMENT FOR REMOVING OIL IN A ROLL

(75) Inventors: James Blais; Kari Röyskö; Jori Onnela, all of Jyväsklyä; Ari Lehto, Leppävesi; Sami Vanhamäki; Risto Haiko, both of Jyväskylä, all of (FI)

(73) Assignee: Metso Paper, Inc., Helsinki (FI)

( * ) Notice: Subject to any disclaimer, the term of this patent is extended or adjusted under 35 U.S.C. 154(b) by 0 days.

(21) Appl. No.: 09/814,652

(22) Filed: Mar. 22, 2001

Related U.S. Application Data

(63) Continuation of application No. PCT/FI99/00783, filed on Sep. 23, 1999.

(30) Foreign Application Priority Data

Sep. 23, 1998 (FI) .................................................. 982045

(51) Int. Cl.⁷ ................................................ B23P 15/00
(52) U.S. Cl. ................................. 492/16; 492/7; 492/20
(58) Field of Search ............................. 492/7, 16, 20; 29/895.1; 162/272, 358.3

(56) References Cited

U.S. PATENT DOCUMENTS

| | | | | |
|---|---|---|---|---|
| 5,645,517 A | * | 7/1997 | Stotz | 492/7 |
| 5,846,173 A | * | 12/1998 | Grabscheild et al. | 492/7 |
| 5,853,359 A | | 12/1998 | Grabscheid et al. | |
| 6,206,813 B1 | * | 3/2001 | Nikulainen | 492/16 |

FOREIGN PATENT DOCUMENTS

| | | |
|---|---|---|
| DE | 44 02 754 A1 | 6/1994 |
| EP | 0 812 994 A1 | 12/1997 |
| FI | 98318 | 2/1997 |
| WO | WO 98/38381 | 9/1998 |

OTHER PUBLICATIONS

Official Action dated Aug. 26, 1999, in FI 982045 with English Translation.
PCT International Search Report in PCT/FI 99/00783.

* cited by examiner

*Primary Examiner*—I Cuda Rosenbaum
(74) *Attorney, Agent, or Firm*—Lathrop & Clark LLP

(57) ABSTRACT

The roll comprises a stationary support construction (11) and a roll mantle (12) revolving around the construction, which mantle is supported from its inner face (12') on the support construction (11) by at least one hydraulically loaded loading member (13), by which the roll mantle (12) is loaded against a backup roll (20) which forms a nip (N) with the roll. The oil removing arrangement comprises an oil collecting equipment (90) fitted in the space between the outer face (11") of the support construction (11) and the inner face (12') of the roll mantle (12), in which oil collecting equipment there is an oil guide plate (91) which is supported at least on the support construction (11), which is arc-shaped in the direction of the circumference and which forms a first oil guide face. At the lateral edges of the oil guide plate (91), there are radial side walls (93,94) directed towards the support construction, and at the curved rear edge there is a curved rear wall (92). In the space between the oil collecting equipment (90) and the outer face (11") of the support construction (11), a flow passage is formed, along which the oil present in the roll is guided into oil guide arrangements passing out of the roll.

23 Claims, 13 Drawing Sheets

ARRANGEMENT FOR REMOVING OIL IN A ROLL

CROSS REFERENCES TO RELATED APPLICATIONS

This application is a continuation of PCT application No. PCT/FI99/00783, filed Sep. 23, 1999, and claims priority on Finnish Application No. 982045, Filed Sep. 23, 1998, the disclosures of both of which applications are hereby incorporated by reference herein.

STATEMENT AS TO RIGHTS TO INVENTIONS MADE UNDER FEDERALLY SPONSORED RESEARCH AND DEVELOPMENT

Not applicable.

BACKGROUND OF THE INVENTION

An arrangement for removing oil in accordance with the present invention can be employed in all rolls in which there is a stationary support construction around which the roll mantle revolves and in which it is desirable to drain the oil that is gathered in the roll. Such rolls are, for example, variable-crown rolls in paper or board machines, rolls whose mantle can be shifted in the nip plane in relation to the stationary support construction, and extended-nip rolls.

In such rolls, a problem is whipping of the oil and poor drainage of the oil out of the roll interior. Oil is passed into the space between the loading members and the inner face of the roll mantle for purposes of lubrication, and, also, oil may be sprayed onto the inner face of the roll mantle for purposes of cooling. When the roll mantle revolves, said lubrication oil and cooling oil is gathered on the inner face of the roll mantle by the effect of centrifugal force, being carried along with the inner face of the revolving roll mantle. Said lubrication oil and cooling oil ought to be drained away from the inner face of the mantle as soon as possible in order that the oil could not be whipped when it collides against the loading members and against other support members. Excessive oil gathered on the inner face of the roll mantle also increases the amount of energy needed in order to rotate the roll mantle.

In the applicant's FI Utility Model No. 2920, an arrangement of equipment is described in connection with a variable-crown roll provided with loading shoes in order to prevent foaming of oil. This arrangement of equipment comprises a separate guide that drags against the inner face of the roll mantle and on said guide a face that guides the oil and by whose means the oil present on the inner face of the roll mantle is doctored and guided as an open flow into a collecting trough attached to the stationary roll axle.

In the applicant's FI Laid-Open Publication No. 98,318, an arrangement is described for draining of oil out of a roll which comprises a non-revolving roll axle, on which the roll mantle has been fitted revolving. Between the roll mantle and the roll axle, hydraulic loading elements have been fitted, which act upon the inner face of the roll mantle in the nip plane, which are supported on the roll axle, and which are loaded with a pressure medium. Said loading elements comprise pistons fitted in cylinder bores that have been formed in the roll axle and glide shoes supported against the inner face of the roll mantle, which glide shoes are provided with pockets separated by lateral ridges and by intermediate ridges and operating as lubrication spaces. Into at least one of the glide shoes in the roll, an oil drain groove has been formed, which groove communicates through a pipe, hose or equivalent with an oil drain duct provided in the roll axle, the oil being arranged to be drained out of the roll through the glide shoe/shoes.

In the EP Patent No. 812,994, a second equipment is described for guiding of an oil flow in connection with a variable-crown roll. The variable-crown roll comprises a stationary central axle, which is connected with hydraulically loaded cylindrical loading members, and a roll mantle revolving on support of bearings around the central axle. On the outer face of each loading member of circular section, two radial oil guide members have been fitted symmetrically. Further, at the outer ends of the oil guide members, guide plates extending tangentially to the outer face of the loading shoe have been fitted. When the roll is in a lower position and when the roll mantle revolves clockwise, the oil present on the inner face of the roll mantle strikes against the loading member from the forward side and is guided along the face of the loading member into the oil guide member, from which the oil falls down onto the end face of the central axle and from it further into a first oil collecting trough placed in connection with the central axle. From the first oil collecting trough, the oil is passed along a first duct to the centre of the central axle, from where the oil is passed out of the roll. When the roll is in an upper position and when the roll mantle revolves counterclockwise, the oil strikes against the loading members from the rear side, in which case the oil is again guided between the loading members into the ducts formed by the tangential guide plates. From here the oil proceeds as stripes of a width equal to the width of said ducts on the inner face of the roll mantle and strikes against spring-loaded doctors placed at the side of the central axle opposite to the loading members. From the faces of the doctors, which are spring-loaded against the inner face of the roll mantle, the oil falls down onto the end face of the central axle and from there further into a second oil collecting trough placed in connection with the central axle. From the second oil collecting trough, the oil is passed along a second duct to the centre of the central axle, from where the oil is passed out of the roll. The faces of the doctors that are placed against the inner face of the roll mantle are inclined. When the roll is in a lower position, the oil strikes against the wedge face of the doctor and presses the doctor against the spring, in which connection the oil can pass along the inner face of the roll mantle under the doctor.

The object of the present invention is to provide an efficient oil removing arrangement in a roll.

SUMMARY OF THE INVENTION

By means of the oil collecting equipments connected with the oil removing arrangements in accordance with the present invention, the oil is not collected by doctoring from the inner face of the roll mantle. Thus, in the oil collecting equipments, the curved face which guides the oil and which is placed closest to the inner face of the roll mantle is placed at a distance from the inner face of the roll mantle. In removing of oil taking place by means of doctoring, the friction between the doctor and the inner face of the roll mantle increases the power required to rotate the roll mantle.

When a curved face is used for guiding the oil, a sufficiently long face that guides the oil can be formed between the outer face of the support construction and the inner face of the roll mantle. With a sufficiently long face that guides the oil, the oil flow can calm down, in which case oil cannot return, as a result of vortex formation, back into circulation onto the inner face of the roll mantle. With a curved face, it is also possible to make efficient use of centrifugal force.

Centrifugal force presses the oil flow against the curved face, in which connection the oil flow calms down.

By means of the curved faces of the oil collecting equipments employed in the present invention, economies of space are also obtained, in which case the support construction does not have to be machined so extensively in order to provide space. By means of curved faces, the volumes of the oil collecting equipments can be maximized.

In the following, the invention will be described with reference to the figures in the accompanying drawings, the invention being, however, not supposed to be confined to the details of said illustrations alone.

Further objects, features and advantages of the invention will be apparent from the following detailed description when taken in conjunction with the accompanying drawings.

DESCRIPTION OF THE PREFERRED EMBODIMENTS

Figure 1:
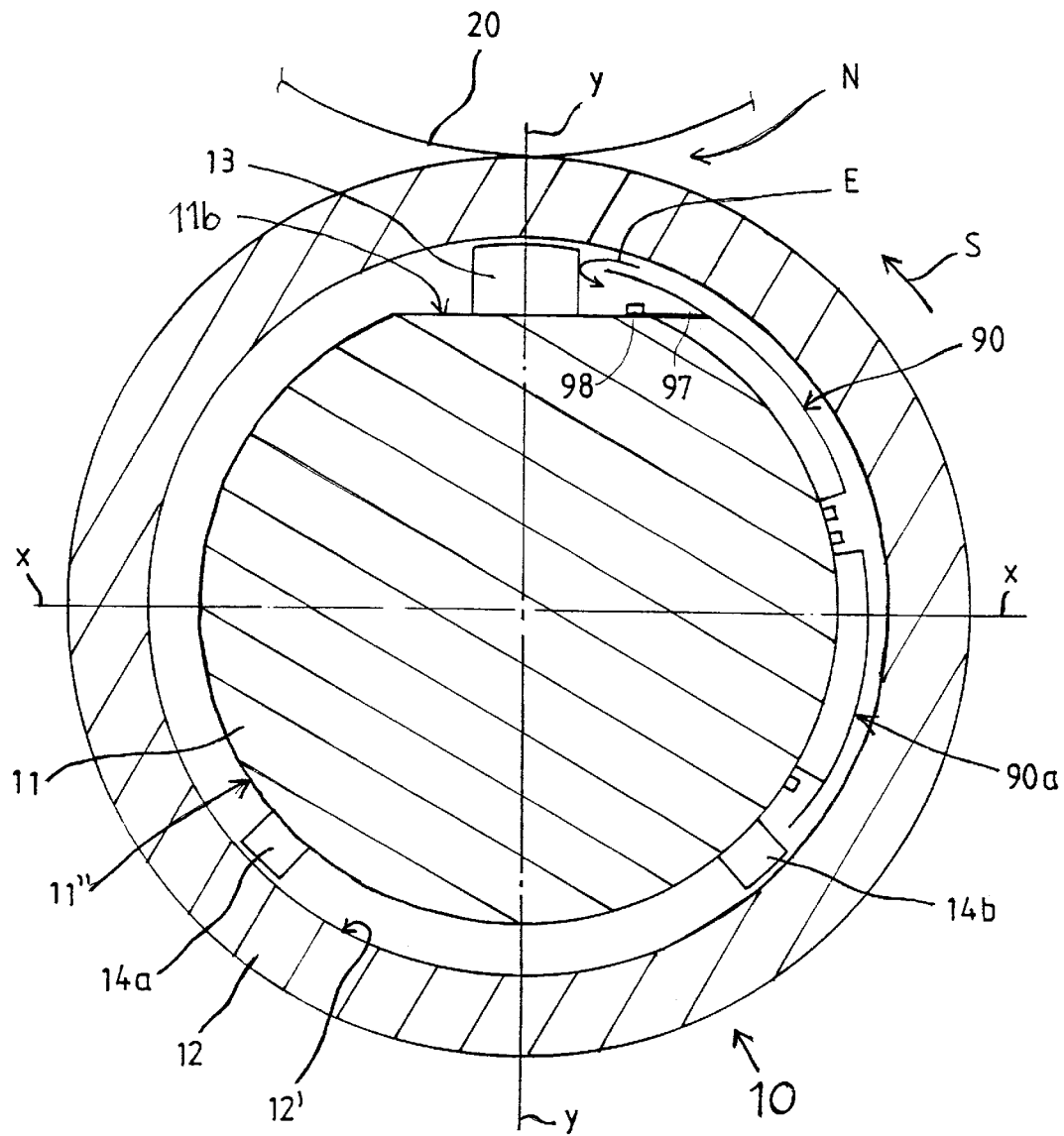
FIG. 1 is a schematic sectional view of an oil removing arrangement in accordance with a first embodiment of the present invention in a variable-crown roll.
Figure 3:
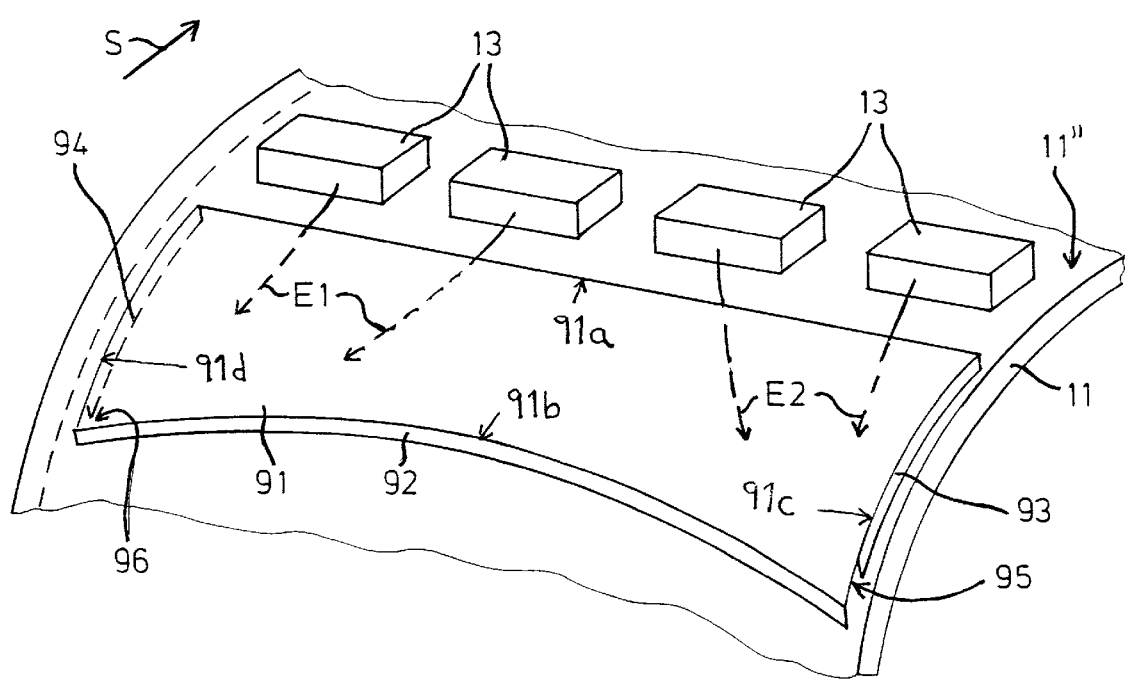
FIG. 3 is a schematic axonometric view of the oil removing equipment employed in FIGS. 1 and 2.
Figure 4:
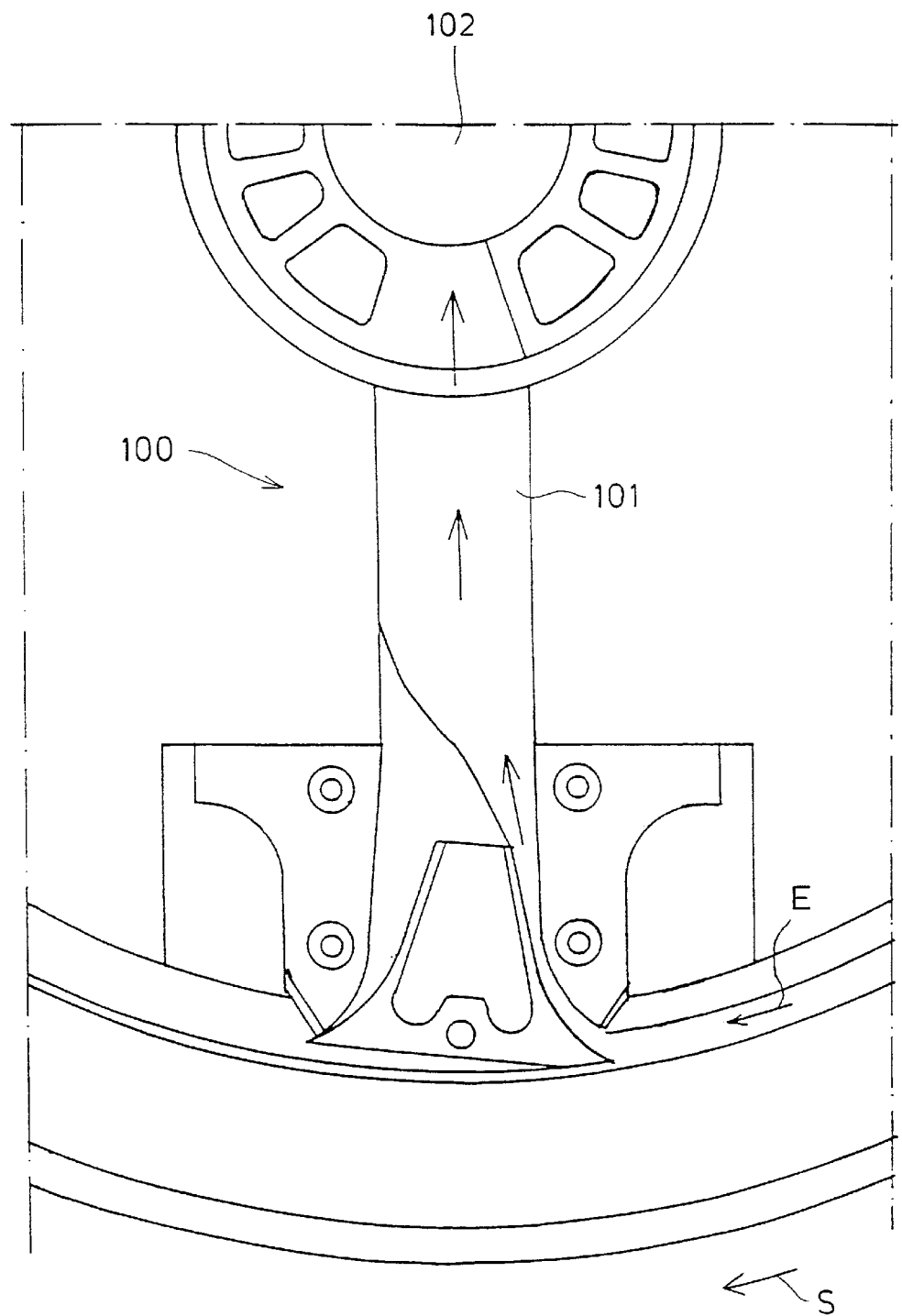
FIG. 4 is a schematic sectional view of an oil removing syphon.
Figure 5:
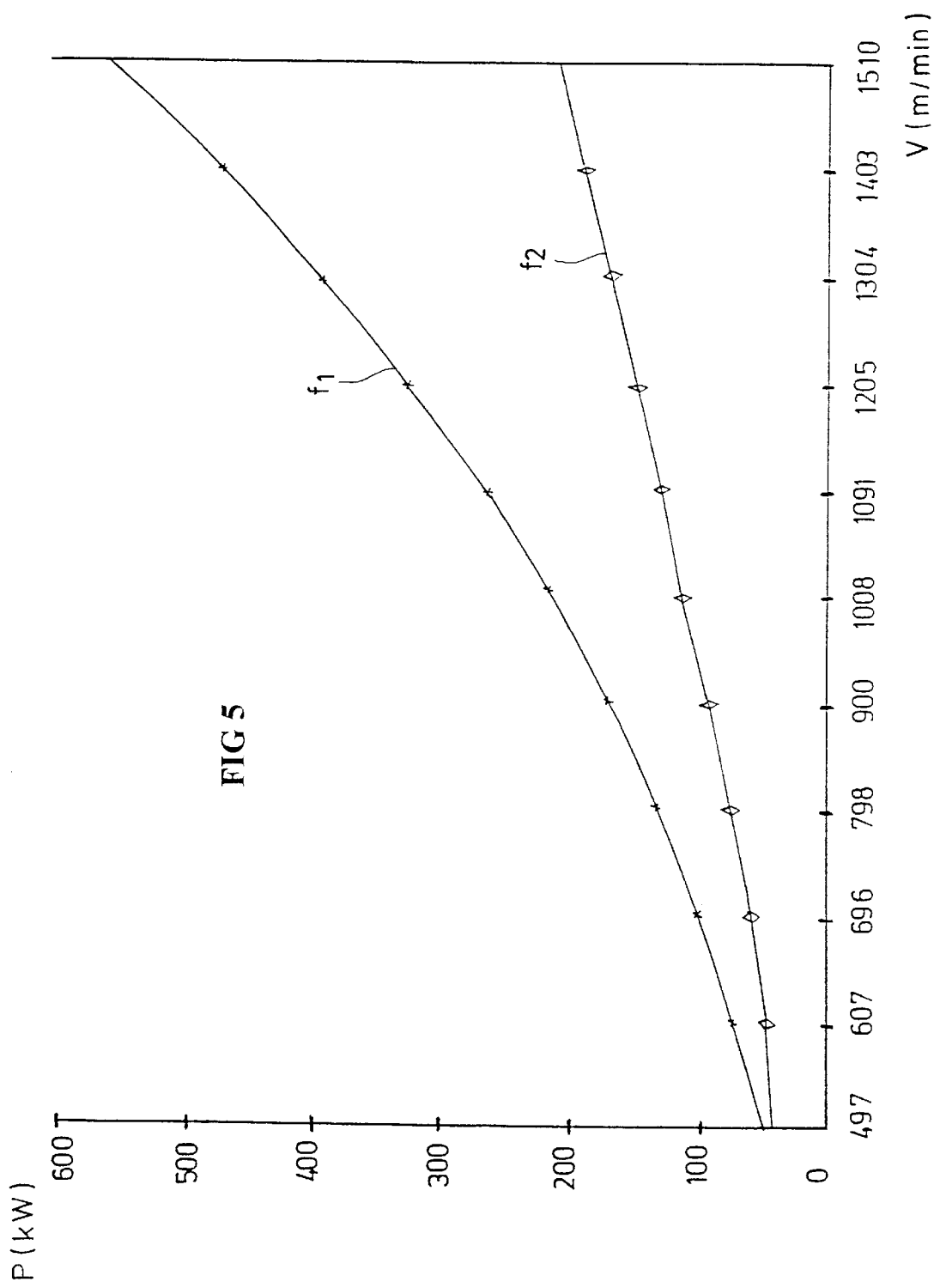
FIG. 5 illustrates the power consumption of a variable-crown roll as a function of the speed of rotation of the roll mantle with a roll provided with oil removing syphons alone and with a roll provided both with oil removing syphons and with an oil removing arrangement as shown in FIG. 1.

FIG. 1 shows a first embodiment of the oil removing arrangement in accordance with the invention in a variable-crown roll 10. In the situation shown in FIG. 1, the variable-crown roll 10 is in a lower position, and the sense of rotation S of the roll mantle 12 is counterclockwise. In the situation shown in FIG. 2, the variable-crown roll 10 is in an upper position, and the sense of rotation S' of the roll mantle 12 is clockwise. FIG. 3 is a schematic axonometric view of the oil collecting equipment 90 shown in FIGS. 1 and 2. FIG. 4 is a sectional view of the oil removing syphon employed in this embodiment, and FIG. 5 illustrates the power requirement of the roll as a function of the speed of rotation of the mantle 12 in a situation in which the oil collecting equipment 90 is employed and in a situation in which no oil collecting equipment 90 is employed.

The variable-crown roll 10 shown in FIG. 1 comprises a stationary support construction 11 of substantially circular section and a roll mantle 12 revolving counterclockwise S around said support construction, which roll mantle is supported from its inner face 12' on the support construction 11 by means of at least one hydraulically loaded loading member 13, by means of which loading member the roll mantle 12 can be loaded against a backup roll 20 which forms a nip N with the variable-crown roll. In the support construction 11, at the loading member 13, there is a plane top face 11b diverging from the circular form. Further, the mantle 12 is supported on the support construction 11 by means of hydraulically adjustable support members 14a, 14b placed at the side of the support construction 11 opposite to the loading member 13 in view of regulation of the linear load. In these so-called counter-zones, the spacing of the support members 14a, 14b in the longitudinal direction of the roll is less dense than the spacing of the loading members 13 at the nip N. In FIG. 1, the axial nip plane Y—Y of the roll and the axial neutral plane X—X placed perpendicularly to the nip plane Y—Y on the central axis of the roll are also shown. In the variable-crown roll, lubrication oil is fed between the loading member 13 and the inner face of the roll mantle 12. In the variable-crown roll, it is further possible to spray oil onto the inner face 12' of the roll mantle 12 for purposes of cooling. When the roll mantle 12 revolves, the lubricating oil and cooling oil is gathered on the inner face of the roll mantle, from which it ought to be passed out of the roll.

In a variable-crown roll, the roll mantle 12 is loaded by means of the loading members 13 exclusively in order to compensate for bending. In a roll with a mobile mantle, the mantle 12 is both shifted in relation to the support construction 11 and loaded against a backup roll.

The oil collecting equipment 90 shown in FIG. 3 comprises an oil guide plate 91, which extends across the axial direction of the roll mantle and which complies with the curve form of the inner face 12' of the roll mantle 12. The oil guide plate 91 is provided with a straight forward edge 91a, with a curved rear edge 91b, and with straight lateral edges 91c, 91d. Each lateral edge 91c, 91d of the oil guide plate 91 is provided with a radial side wall 93, 94 directed towards the support construction 11. The curved rear edge 91b of the oil guide plate 91 is connected with a curved rear wall 92 directed towards the support construction 11. The distance of the middle part of the curved rear wall 92 from the forward edge 91a of the oil guide plate 91 is smaller than the distance of the lateral portions of the curved rear wall 92 from the forward edge 91a of the oil guide plate 91. The side walls 93, 94 extend from the forward edge 91a of the oil guide plate 91 up to a distance from the rear edge 91b of the oil guide plate 91, in which case oil removing openings 95, 96 remain at the rear corners of the oil guide plate. The sense of rotation S of the roll mantle is also indicated in the figure.

When the oil E gathered on the inner face 12' of the roll mantle 12 collides against the loading shoes 13 in the sense of rotation S of the roll mantle 12, part of the oil flows along the side walls of the loading shoes 13 onto the plane top face 11b of the support construction 11 and from there further along the circumferentially inclined outer face 11" of the support construction 11 in the direction opposite to the sense of rotation S of the roll mantle 12. On the other hand, part of the oil splashes back into the space between the oil guide plate 91 and the outer face 11" of the support construction 11 in the way indicated by the arrows $E_1$ and $E_2$. The oil that travels between the outer face 11" of the support construction and the oil guide plate 91 in the direction opposite to the sense of rotation S of the roll mantle 12 collides against the curved rear wall 92 of the oil collecting equipment 90, in which connection the oil is guided through the openings 95, 96 provided at the rear corners of the oil collecting equipment 90 to the roll ends.

Figure 2:
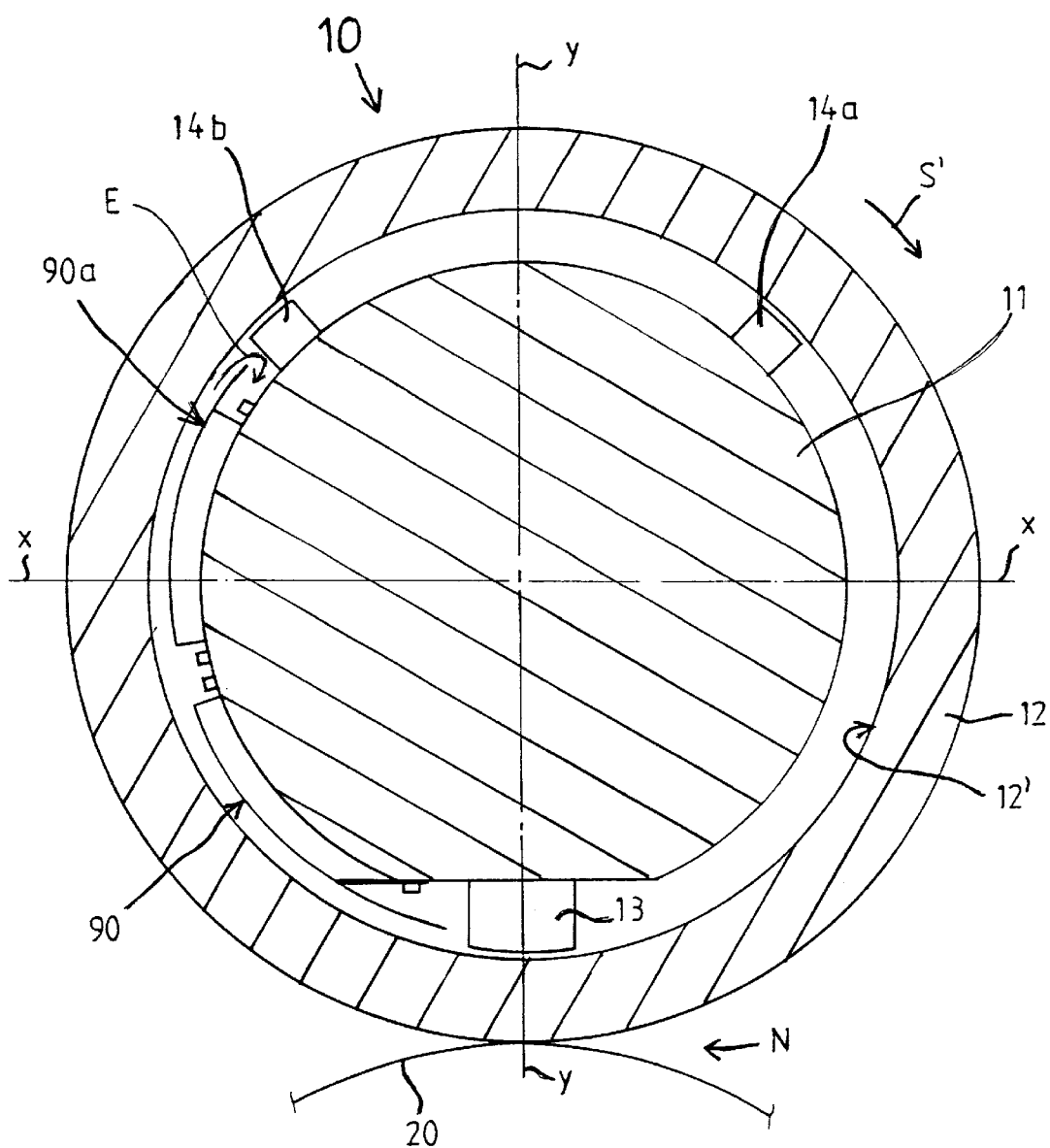
FIG. 2 is a schematic sectional view of the oil removing arrangement in accordance with the invention shown in FIG. 1 when the variable-crown roll operates as the upper roll of a nip.

In the embodiment shown in FIGS. 1 and 2, two oil collecting equipments 90, 90a are employed. In the situation of FIG. 1, in which the roll is in a lower position and the sense of rotation S of the roll is counterclockwise, an oil collecting equipment 90 opening against the loading member 13 is employed for collecting of oil, and in the situation of FIG. 2, in which the roll is in an upper position and the sense of rotation S' of the roll is clockwise, an oil collecting equipment 90 opening towards the support member 14b of the counter-zone is employed. The forward part of the oil collecting equipment 90 can be attached to the support construction 11, for example, by means of projections 97 attached to the oil collecting equipment 90, which projections are attached to the support construction 11 by means of bolts 98. The rear part of the oil collecting equipment 90 can be attached to the support construction 11 in a similar way by means of bolts. The first oil collecting equipment 90 is opened against the loading member 13, and the second oil collecting equipment 90a is opened against the loading member 14b of the counter-zone.

In FIGS. 1 and 2, in the roll, the oil collecting equipments 90, 90a have been placed on the right half of the support construction 11 only, but the left half of the support construction 11 can also be provided with oil collecting equipments. In a situation in which the right half and the left half of the support construction 11 have been provided with oil collecting equipments as shown in FIGS. 1 and 2, removing of oil operates in all roll positions and with both senses of rotation. Such a roll can be placed as an upper roll or lower roll at a nip, and the sense of rotation of the roll can be clockwise or counterclockwise in both positions.

In FIGS. 1 and 2, the roll is provided with two oil collecting equipments 90,90a, but the roll can, of course, also be provided with one oil collecting equipment only. In such a case, in the situation of FIG. 1, the roll is provided with an oil collecting equipment 90, and in the situation of FIG. 2 the roll is provided with an oil collecting equipment 90a. If the sense of rotation of the roll is clockwise in FIG. 1, the oil collecting equipment 90 is placed on the left half of the support construction, and if the sense of rotation of the roll is counterclockwise in FIG. 2, the oil collecting equipment 90a is placed on the right half of the support construction.

In the oil collecting equipment 90 shown in FIG. 3, the first oil guide face consists of a curved oil guide plate 91, and the second oil guide face consists of the curved outer face 11" of the support construction 11. In a situation in which the cross section of the support construction 11 is not substantially circular, as the second oil guide face it is possible to use a second oil guide plate, in which case the oil collecting equipment 90 is formed as a box.

FIG. 4 shows an oil removing syphon 100 placed at each end of the roll, by means of which syphon the oil E guided to said roll end by means of the oil removing equipment 90 shown in FIG. 3 is guided into a radial oil drain duct 101 of the oil removing syphon 100 and along said duct further into the central portion of the roll, from which the oil is passed along an axial oil drain duct 102 out of the roll.

In FIG. 5, the curve $f_1$ illustrates a situation in which exclusively oil removing syphons 100 are employed at the ends of the roll, and curve $f_2$ illustrates a situation in which both oil removing syphons 100 and an oil collecting equipment 90 in accordance with the first embodiment of the invention are employed. The curves shown in the figure have been measured in a situation in which oil is sprayed onto the inner face of the roll mantle for purposes of cooling as an invariable flow of 150 liters per minute. It is seen from the figure that the power required to rotate the roll mantle is, at all speeds of rotation, lower when an oil removing arrangement in accordance with the first embodiment of the invention is used $f_2$, compared with a situation in which exclusively oil removing syphons 100 are used at the roll ends $f_1$.

Figure 6:
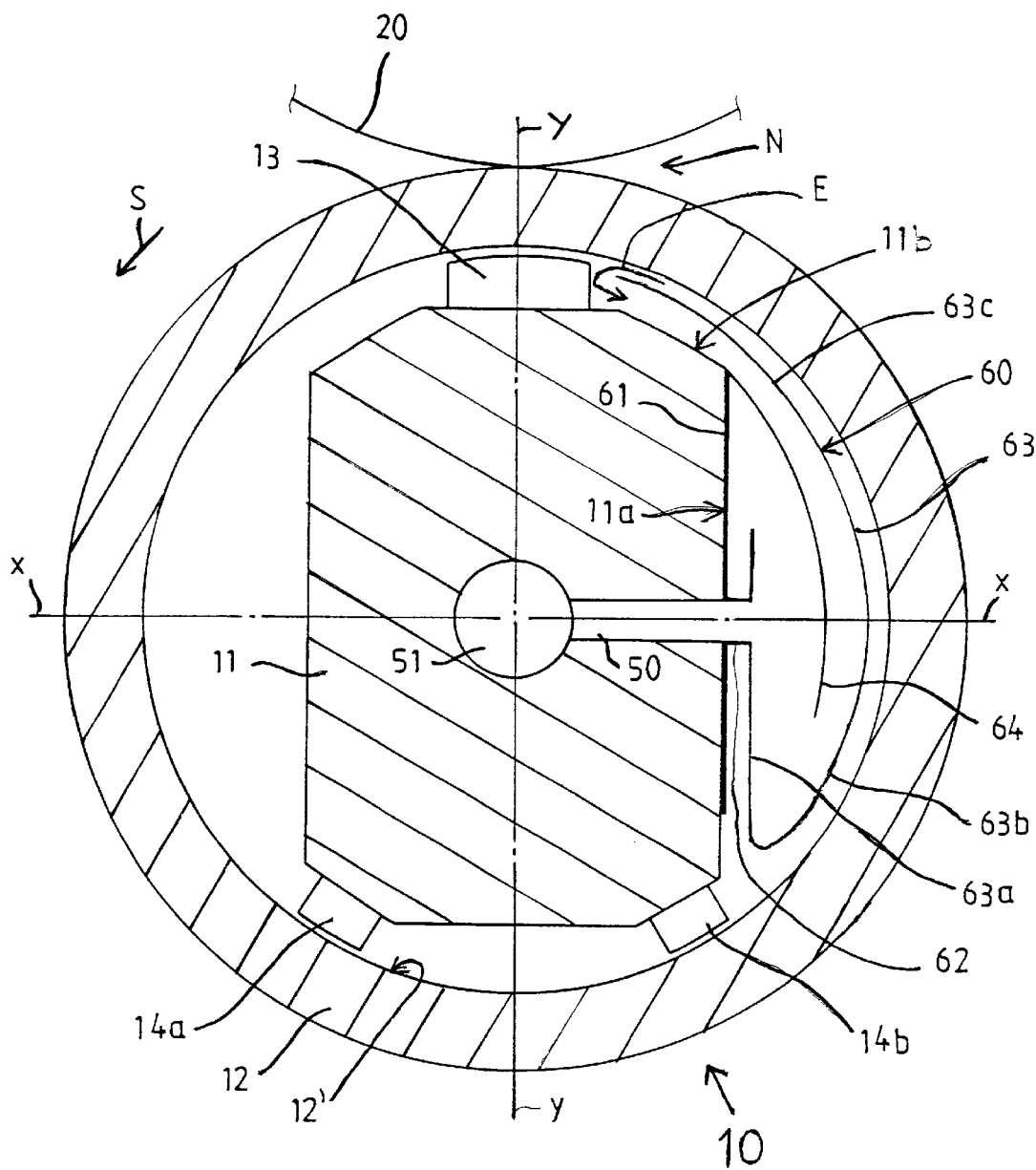
FIG. 6 is a schematic sectional view of an oil removing arrangement in accordance with a second embodiment of the invention in a variable-crown roll.
Figure 7:
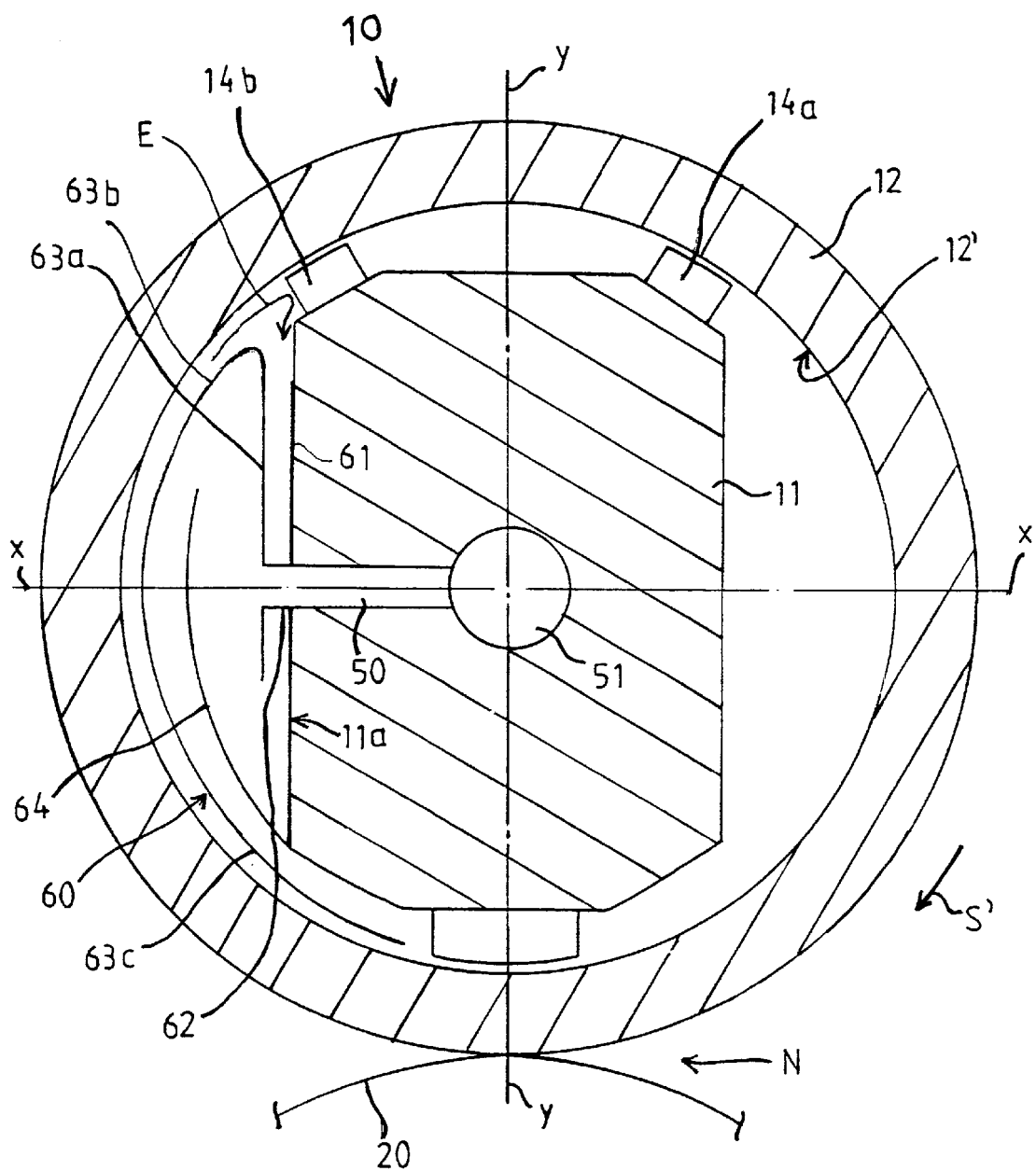
FIG. 7 is a schematic sectional view of the oil removing arrangement in accordance with the invention shown in FIG. 6 when the variable-crown roll operates as the upper roll of a nip.
Figure 8:
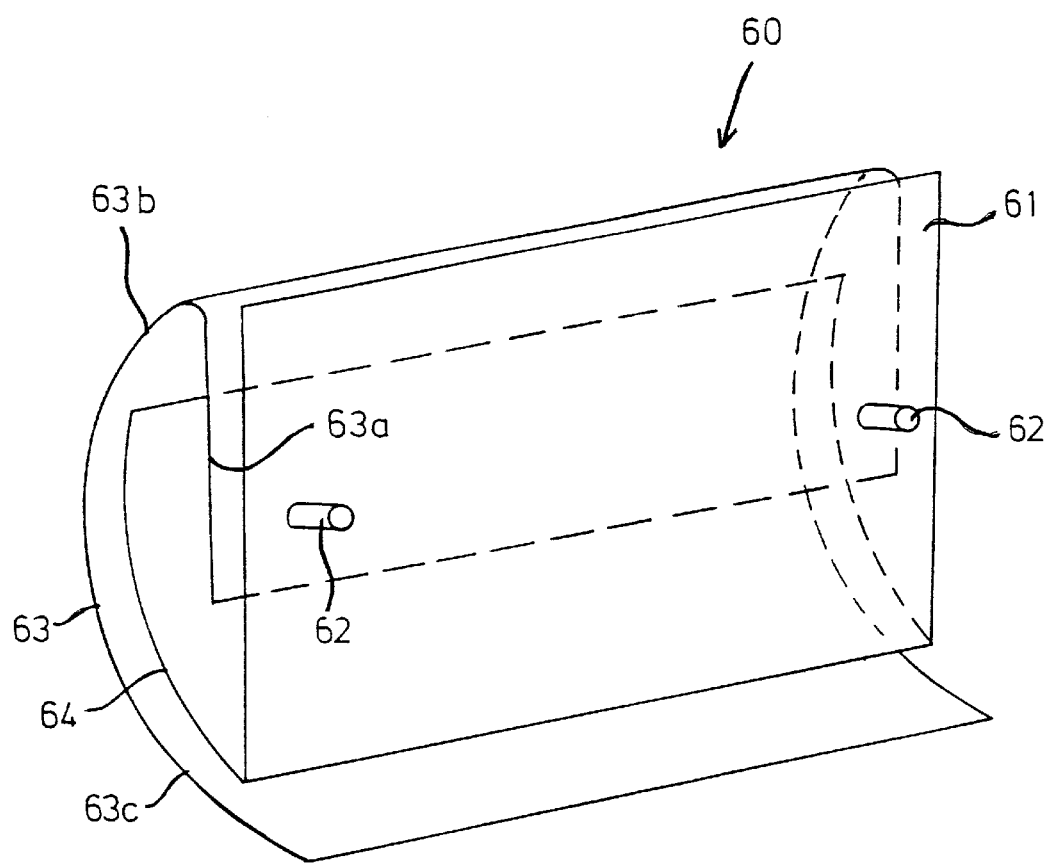
FIG. 8 is a schematic axonometric view of the oil removing equipment employed in FIGS. 6 and 7.

In FIG. 6, an oil removing arrangement related to a second embodiment of the invention has been applied to a variable-crown roll whose support construction is of substantially rectangular section. FIG. 7 illustrates a roll as shown in FIG. 6 while fitted as an upper roll at a nip. FIG. 8 illustrates the oil collecting equipment 60 employed in FIGS. 6 and 7.

The oil collecting equipment 60 shown in FIG. 8 comprises a bottom plate 61, to which ducts 62 extending through the bottom plate 61 have been fixed. To these ducts 62, the outer wall 63 of the oil collecting equipment has been attached, which outer wall is provided with openings passing into the interior of the ducts 62. The outer wall 63 consists of a portion 63a parallel to the bottom plate 61, of a subsequent U-section portion 63b, and of a subsequent curved portion 63c. The oil collecting equipment 60 further comprises a curved partition wall 64 attached to one edge of the bottom plate 61, which partition wall runs at a distance from the curved portion 63c of the outer wall 63 and extends to the area of the U-section portion 63b of the outer wall. The oil collecting equipment 60 may consist of a number of modules, which are installed one after the other in the axial direction of the roll, or the oil collecting equipment 60 may consist of one module extending across the entire axial direction of the roll.

In the situation shown in FIG. 6, the bottom plate 61 of the oil collecting equipment 60 has been mounted against the side face 11a of the support construction 11, in which case the ducts 62 extending through the bottom plate 61 are positioned in the radial oil drain ducts 50 passing into the central portion of the support construction 11. The oil E gathered on the inner face 12' of the roll mantle 12 collides against the loading shoe 13 in the counterclockwise sense of rotation S of the roll mantle, in which connection the oil is disrupted and flows along the side edge of the loading shoe 13 down onto the top face 11b of the support construction 11. This oil is guided in the space between the curved portion 63c of the outer wall 63 of the oil collecting equipment 60 and the curved partition wall 64 into a pocket formed by the outer wall 63, in which pocket the level of oil starts rising. After the oil level has risen sufficiently, the oil flows through the ducts 62 attached to the outer wall 63 into the radial oil drain ducts 50 and further along the axial oil drain duct 51 in the central portion of the support construction 11 out of the roll.

In the situation shown in FIG. 7, the oil E gathered on the inner face 12' of the roll mantle 12 collides against the support members 14b of the counter-zone in the clockwise sense of rotation S' of the roll mantle, in which connection the oil is disrupted and flows along the side face of the support member 14b of the counter-zone and along the side face 11a of the support construction 11 through the space between the bottom plate 61 of the oil collecting equipment 60 and the straight portion 63a of the outer wall 63 into a pocket formed by the bottom plate 61 and by the partition wall 64, in which pocket the oil level starts rising. After the oil level has risen sufficiently, the oil flows through the ducts 62 attached to the outer wall 64 into the radial oil drain ducts 50 and further along the axial oil drain duct 51 in the central portion of the support construction 11 out of the roll.

The use of the oil collecting equipment 60 shown in FIG. 8 does, of course, not require that the roll is provided with a support construction 11 of substantially rectangular section as shown in FIGS. 6 and 7. The side face of the support construction 1 can also be, for example, arc-shaped, in which case the bottom plate 61 of the oil collecting equipment 60 is similarly arc-shaped.

In the embodiments shown in FIGS. 6 and 7, just one oil collecting equipment 60 is employed, which rests against one side face 11a of the support construction 11. In the roll, it is, of course, also possible to employ two oil collecting equipments, in which case the other oil collecting equipment is placed at the opposite side of the support construction. When the roll is provided with two oil collecting equipments placed at opposite sides of the support construction, the removal of oil can be made to operate in all roll positions and with all senses of rotation.

Figure 9:
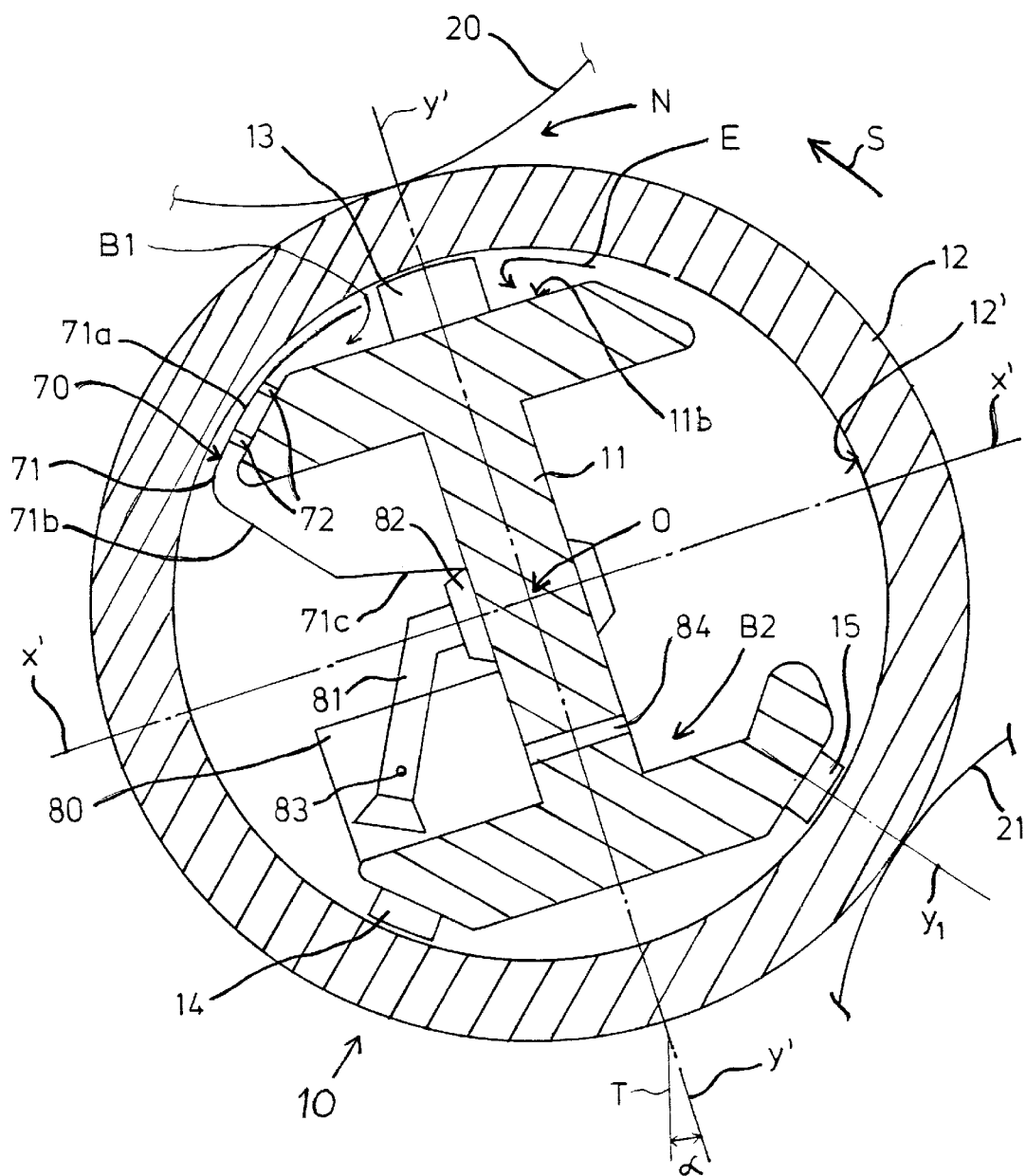
FIG. 9 is a schematic sectional view of an oil removing arrangement in accordance with a third embodiment of the invention in a variable-crown roll.

FIG. 9 illustrates a third embodiment of the oil removing arrangement in accordance with the invention in a variable-crown roll. In this embodiment, the principal nip plane Y'—Y' forms an angle α with the vertical plane T. The angle α can be, for example, in a range of about 0–45°. Besides the principal nip plane Y'—Y', the roll also forms a secondary nip plane $Y_1$ with a second backup roll 21 at the secondary loading shoe 15. The figure also shows an auxiliary plane X'—X', which passes through the centre point O of the circle that follows the outer face of the roll mantle and which intersects the principal nip plane Y'—Y' at an angle of 90°. The sectional form of the support construction 11 of the variable-crown roll is I-shaped, and the sense of rotation S of the roll mantle 12 is counterclockwise.

The oil collecting equipment 70 shown in FIG. 9 comprises an oil guide plate 71 extending across the axial length of the roll mantle 12, which oil guide plate consists of a curved upper portion 71a, of a first straight portion 71b following said curved portion after a bend, and of a second straight portion 71c following said first straight portion after a bend. The oil guide plate 71 has been attached to the inclined portion of the top face of the support construction 11 from its curved upper portion 71a by means of fastening means, for example bolts 72. Further, if necessary, the second straight portion 71c of the oil guide plate 71 can be attached to the middle portion of the support construction 11. The oil guide plate 71 extends across the axial direction of the roll, and the edges of the oil guide plate 71 can be provided with side walls directed towards the support construction 11 (not shown in the figure).

The oil removing arrangement further comprises an oil collecting trough 80 fitted in the lower portion of the support construction 11 and an axial oil drain duct 82 fitted in the middle portion of the support construction 11 on the auxiliary plane X'—X', which oil drain duct communicates with the oil collecting trough 80 through an oil drain pipe 81. Above the bottom face of the oil collecting trough 80, in the middle portion of the support construction 11, an oil drain hole 84 has been formed, which extends through the middle portion of the support construction 11.

When the oil E gathered on the inner face of the roll mantle 12 collides against the loading members 13 in the sense of rotation S of the roll mantle 12, part of the oil flows along the side face of the loading members 13 onto the top face 11b of the support construction 11. After this the oil flows along the inclined top face 11b of the support construction 11 between the loading members 13 into the space B1 between the oil guide plate 71 and the top face 11a of the support construction 11, out of which space the oil flows further, through the duct between the curved top portion 71a of the oil guide plate 71 and the inclined portion of the top face of the support construction 11, onto the first straight portion 71b of the oil guide plate 71 and along the inclined face of said plate portion onto the second straight portion 71c of the oil guide plate 71 and along its inclined face to the vicinity of the side wall of the middle portion of the support construction 11, from where the oil falls down into the oil collecting trough 80 placed in the lower portion of the support construction 11.

When the oil E gathered in the inner face of the roll mantle 12 collides against the loading members 13 in the sense of rotation S of the roll mantle, part of the oil splashes back against the sense of rotation S of the roll mantle so that it falls from the right side of the support construction 11 into the oil collecting space B2 formed by the bottom portion of the support construction 11, out of which space the oil flows further through the oil drain hole 84 provided in the support construction 11 into the oil collecting trough 80.

From the oil collecting trough 80, the oil is removed, by the effect of the pressure present inside the roll mantle 12, along the oil drain pipe 81 into the axial oil drain duct 82 and along said duct out of the roll. In the oil drain pipe 81, there are air holes 83, which permit the oil level to rise in the oil collecting trough 80 up to the air holes 83. When the oil level is lower than the level of the air holes 83, air flows out of the interior of the roll mantle 12 through the holes 83. When the oil level in the oil removing trough 80 rises, the air holes 83 remains below the oil level, in which case oil starts being discharged properly out of the oil removing trough 80.

Figure 10:
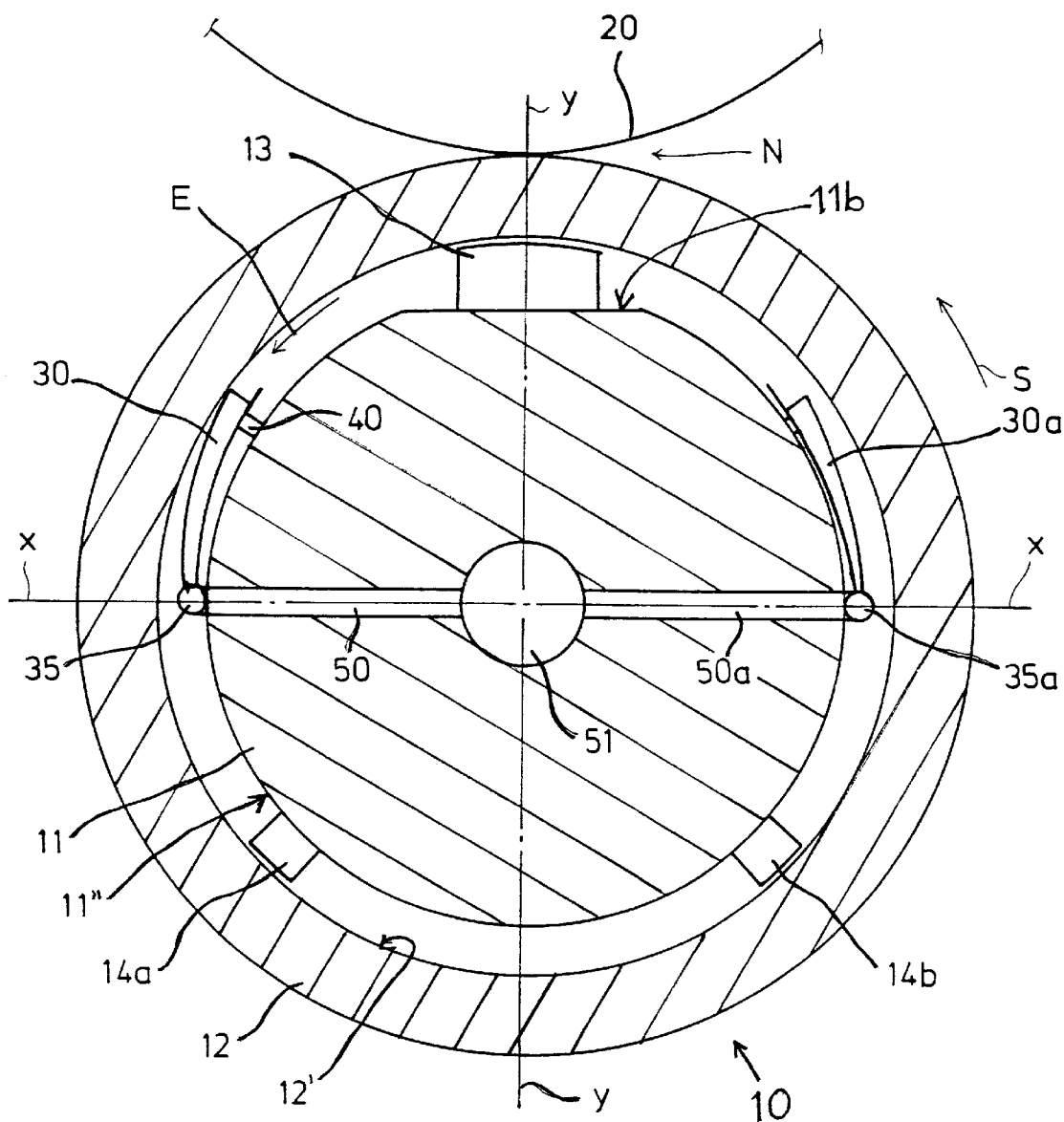
FIG. 10 is a schematic sectional view of an oil removing arrangement in accordance with a fourth embodiment of the invention in a variable-crown roll.
Figure 11:
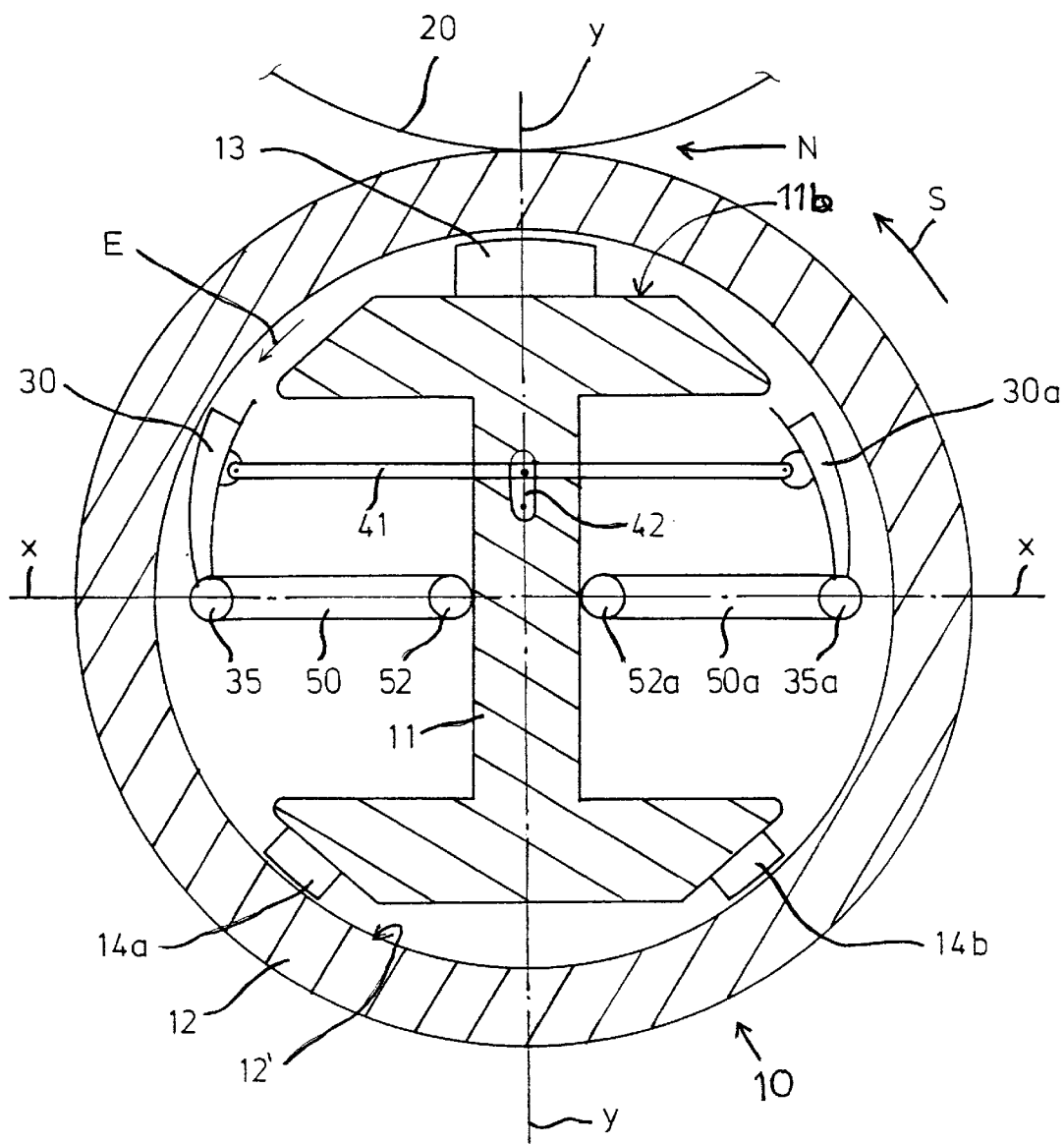
FIG. 11 is a schematic sectional view of a variation of the oil removing arrangement shown in FIG. 10 in a variable-crown roll.
Figure 12:
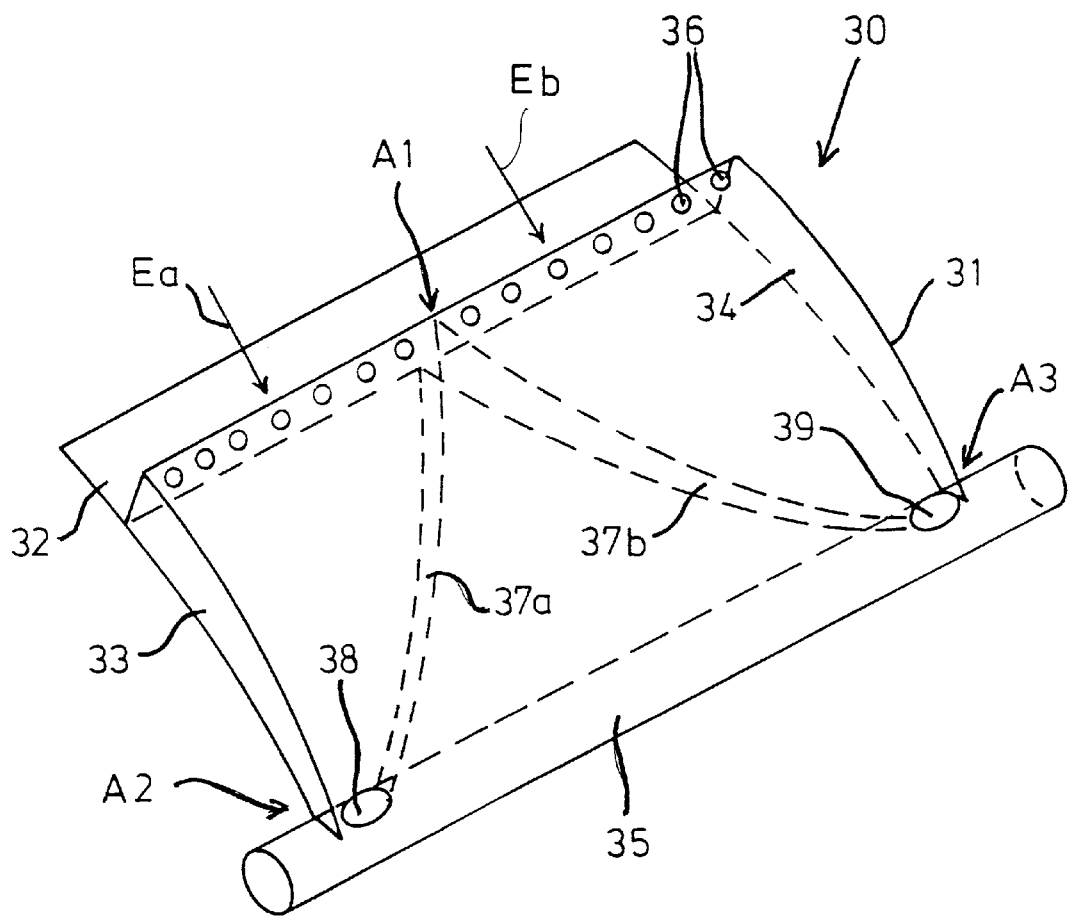
FIG. 12 is a schematic axonometric view of the oil removing equipment employed in FIGS. 10 and 11.

In FIG. 10, an oil removing arrangement related to a fourth embodiment of the invention is applied in a variable-crown roll, whose support construction 11 is of substantially circular section. In FIG. 11, an oil removing arrangement related to the fourth embodiment of the invention is applied in a variable-crown roll whose support construction 11 is of substantially I-section. FIG. 12 shows an oil collecting trough 30 employed in FIGS. 10 and 11.

FIG. 12 shows an oil collecting equipment 30 connected with the oil removing arrangement illustrated in FIGS. 10 and 11. The oil collecting equipment 30 comprises a rectangular outer wall 31 and a rectangular inner wall 32 placed at a distance from said outer wall. The outer wall 31 and the inner wall 32 have been bent into a curve form in the direction of the circumference, and they extend across the axial length of the roll mantle 12. The forward edge of the inner wall 32 of the oil collecting equipment 30 extends, in the direction of the circumference, further than the forward edge of the outer wall 31 of the oil collecting equipment 30. The edges of the outer wall 31 and of the inner wall 32 of the oil collecting equipment 30 have been interconnected by means of radial side walls 33, 34. The rear edges of the outer wall 31 and of the inner wall 32 of the oil collecting equipment 30 have been fixed to an axial oil guide duct 35. On the outer face of the forward edge of the outer wall 31 of the oil collecting equipment 30, there is a row of pins 36, by whose means the outer wall 31 is kept at a distance from the inner face 12' of the roll mantle 12. The radial distance between the outer wall 31 and the inner wall 32 of the oil collecting equipment 30 is larger at the forward edge of the outer wall 31 than at the rear edges of the outer wall 31 and the inner wall 32, in which case they form a gap between them, which gap collects oil.

The interior space in the oil collecting equipment 30 shown in FIG. 12 has been divided into two parts by means of two oil guide plates 37a, 37b. The oil guide plates 37a, 37b have a common starting point A1 in the middle portion of the forward edge of the oil collecting equipment 30. The first oil guide plate 37a is directed from this common starting point A1 in curve form towards the first rear corner of the oil collecting equipment 30, and the second oil guide plate 37 is directed from this common starting point in curve form towards the second rear corner of the oil collecting equipment 30. In the oil guide duct 35, at said rear corners, there are openings 38, 39 opening into the interior of the oil collecting equipment 30, through which openings the oil guided by the oil guide plates 37a, 37b is carried into said oil guide duct 35.

In the oil collecting equipment 30 shown in FIG. 12, the oil gathered on the inner face 12" of the roll mantle 12 is passed through the openings at the forward edge of the oil collecting equipment 30 in the direction of the arrows Ea, Eb into either part of the oil collecting equipment 30. In each part, the oil is guided by means of the oil guide plate 37a, 37b, the outer wall 31, the inner wall 32, and by means of the side wall 33, 34 through said openings 38, 39 into the oil guide duct 35. The circumferential flow of the oil is turned by means of the curved oil guide plates 37a, 37b towards the axial direction in order that no abrupt change of 90° should occur in the flow direction of the oil as the oil passes into the oil guide duct 35.

In FIG. 10, the oil collecting equipment 30 has been attached to the outer face 11" of the support construction 11 of substantially circular section by means of an actuator 40, e.g. a cylinder-piston construction, by whose means the oil collecting equipment 30 and the connected axial oil guide duct 35 can be pivoted around the central axis of the oil guide duct 35 between an outer and an inner position. In the outer position, the pins 36 provided on the outer face of the forward edge of the outer wall 31 of the oil collecting equipment 30 are in contact with the inner face 12' of the roll mantle 12. In the inner position, the outer wall 31 of the oil collecting equipment 30 is at a distance from the inner face 12' of the roll mantle 12. The oil guide duct 35 connected with the oil collecting equipment 30 is placed on the neutral plane X—X, and each end of the oil guide duct 35 communicates, through radial oil guide ducts 50, with an axial oil drain duct 51 placed in the central part of the support construction 11. When the oil collecting equipment 30 is in the outer position, the forward edge of the outer wall 31 of the oil collecting equipment 30 guides oil that has gathered on the inner face 12' of the roll mantle 12 into the oil collecting equipment 30, from which it is passed into the axial oil guide duct 35 and, through the connected radial oil guide ducts 50 and through the axial oil drain duct 51 placed in the centre of the support construction 11, out of the roll.

In the embodiment shown in FIG. 10, on the neutral plane X—X, at both sides of the support construction, there are oil collecting equipments 30,30a. In the figure, the oil collecting equipment 30 placed at the left side is in the outer position, and the oil collecting equipment 30a placed at the right side is in the inner position. When the roll mantle 12 revolves counterclockwise S, the oil collecting equipment 30 placed in the outer position at the left side forms a gap opening against the sense of rotation S of the roll mantle, by means of which gap the oil gathered on the inner face 12' of the roll mantle can be collected into the oil collecting equipment 30. In such a case, the oil collecting equipment 30a placed at the right side is in the inner position. As the roll mantle 12 revolves clockwise, i.e. opposite to the arrow S, the oil collecting equipment 30 placed at the left side is shifted to the inner position, and the oil collecting equipment 30a placed at the right side is shifted similarly to the outer position. When the roll mantle 12 revolves clockwise, the oil collecting equipment 30a placed at the right side in the outer position forms a gap opening against the sense of rotation of the mantle 12, by means of which gap oil gathered on the inner face 12' of the mantle 12 can be collected into the oil collecting equipment 30a.

In the embodiment shown in FIG. 11, each end of the axial oil guide duct 33 connected with the oil collecting equipment 30 communicates with the radial oil guide ducts 50, by whose means the oil is guided into the axial oil drain ducts 52 fitted in the middle part of the roll at the side of the vertical part of the support construction 11. By means of these axial oil drain ducts 52 the oil is passed out of the roll. At each side of the support construction 11, there are oil collecting equipments 30, 30a, and they are controlled in a way similar to that shown in FIG. 1. Here the oil collecting equipments 30, 30a have been interconnected by means of a rod 41 extending through the vertical part of the support construction 11. The oil collecting equipments 30, 30a have been supported by means of articulation points on the ends of the rod 41, and the middle part of the rod 41 has been supported by means of an articulation point on a pivoting device 42, which is again supported by means of an articulation point on the vertical part of the support construction 11. When the pivoting device 42 is pivoted, the left oil collecting equipment 30 can be taken to use when the roll mantle revolve s counterclockwise S, and the right oil collecting equipment 30a can be taken to use when the roll mantle revolves clockwise.

As the axial oil guide duct 35 of the oil collecting equipment 30 shown in FIG. 12 is attached to the support construction 11 exclusively from its axial ends, bending of the middle part of the support construction 11. does not affect the oil collecting equipment 30, but the pins 36 on the outer wall 31 of the oil collecting equipment 30 remain in contact with the inner face 12' of the roll mantle 12 over the entire axial length.

In FIGS. 10 and 11, the roll is provided with two oil collecting equipments 30, 30a, but, of course, the roll can also be provided with one oil collecting equipment only. In such a case, in the situation of FIG. 10, the roll is provided with the oil collecting equipment 30, and in the situation of FIG. 11 the roll is provided with the oil collecting equipment 30a. In such a case, it is not necessary to use the actuator 40, by whose means the oil collecting equipment 30, 30a is supported on the support construction 1, but the oil collecting equipment 30, 30a can be supported on the support construction 11 rigidly in the outer position.

Figure 13:
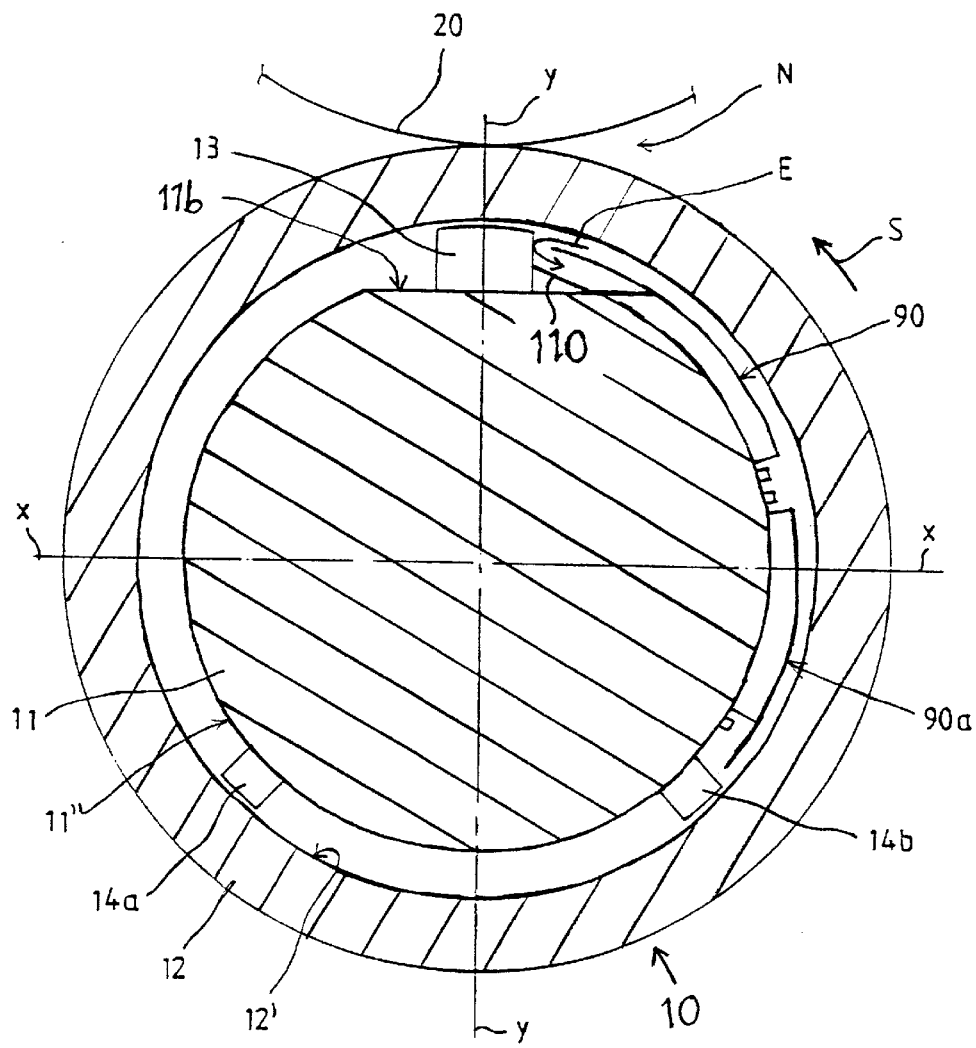
FIG. 13 is a schematic sectional view of a first embodiment of the invention to which an oil guide has been added.

FIG. 13 shows an oil guide 110, which has been added to the embodiment shown in FIG. 1. The oil guide 110 is placed before the loading member 13, as viewed in the sense of rotation S of the roll mantle 12, and the oil guide forms an inclined plane from the side face of the loading member 13 to the curved outer face 11" of the support construction 11. When the oil E carried along with the roll mantle 12 collides against the loading members 13, part of the oil flows along the side face of the loading member 13 down onto the substantially horizontal top face 11b of the support construction, from which the oil E seeks its way, with the aid of gravity, into the oil collecting equipment 90. In particular the oil that flows slowly along the top face 11b of the support construction 11 tends to be subjected to vortex formation arising from air flows present in the roll, in which case part of this oil E has access back onto the inner face 12' of the roll mantle 12. The situation can be improved by providing the top face 11b of the support construction 11 with an oil guide 110, along which the oil is guided more efficiently into the oil collecting equipment 90.

Figure 14:
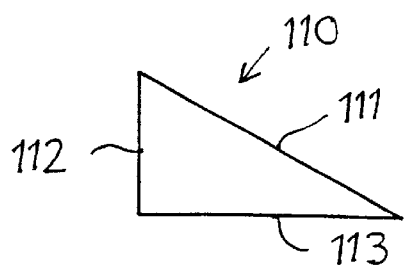
FIG. 14 is a schematic sectional view of an embodiment of an oil guide.

FIG. 14 is a schematic sectional view of an oil guide 110 which can be used. The sectional form of the oil guide 110 is substantially that of a right-angled triangle. The vertical wall 112 of the oil guide 110 is placed against the loading member 13, and the horizontal wall 113 of the oil guide 110 is placed against the top face 11b of the support construction 11. The wall 111 placed opposite to the right angle forms an inclined oil guide plane, along which the oil E that collides against the loading member 13 is guided into the oil collecting equipment 90. The vertical wall 112 that is placed against the loading member 13 remains at a distance from the top face of the loading member 13 and from the inner face 12' of the roll mantle 12. Thus, the oil E is allowed to collide against the loading member 13, after which the oil that flows along the side face of the loading member 13 is guided along the inclined oil guide plane 111 into the oil collecting equipment 90.

Figure 15:
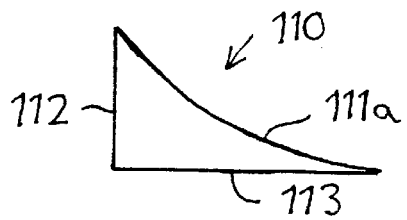
FIG. 15 is a schematic sectional view of a second embodiment of an oil guide.

FIG. 15 is a schematic sectional view of a second oil guide 110 which can be used. This embodiment differs from the embodiment shown in FIG. 14 in respect of the shape of the oil guide plane 111a. In stead of an inclined plane, herein a curved face 111a is used, along which the oil E colliding against the loading member 13 is guided into the oil collecting equipment 90.

In a roll, it is possible to use a number of oil guides 110 so that an oil guide 110 is fitted in front of each loading member 13, as viewed in the sense of rotation of the roll mantle. It is also possible to imagine that one oil guide 110 which extends across the entire axial length of the roll mantle 12 is fitted ahead of the loading members 13.

The use of such an oil guide 110 is, of course, not restricted to the situation illustrated in FIG. 1 alone, in which it is used in connection with a loading member 13. An oil guide 110 can be used, for example, in a situation as shown in FIG. 2 in connection with a support member 14b of a counter-zone, in a situation as shown in FIG. 6 in connection with a loading member, and in a situation as shown in FIG. 7 in connection with a support member 14b of a counter-zone.

In the embodiments shown in FIGS. 1 and 6, the forward edge of the outer wall 63, 91 of the oil collecting equipment 60, 90, which outer wall guides the oil, extends very close to the side walls of the loading members 13. The distance between the outer wall 63, 91 and the side walls of the loading members 13 is favourably in a range of about 10 to 20 mm. In the situation shown in FIG. 2, a corresponding distance is employed between the support member 14b of the backup zone and the forward edge of the outer wall 91a of the second oil collecting equipment 90a.

In the embodiments shown in FIGS. 1 and 6, in the oil collecting equipments 60, 90, a sufficiently long oil guide face 63, 91 is employed in order that the oil flow to be drained could be stilled. As the centrifugal force presses the oil flow against the oil guide face 63, 91, the oil flow cannot be disintegrated and atomized. As measured from the edge of the loading member 13 to the bottom of the oil removing equipment 63, 91, the circumferential length is larger than 20° but smaller than 180°. Said distance is preferably in a range of 90° to 120°.

By means of the oil removing arrangements described above, efficient removal of oil is achieved from the inner face of the roll mantle. By means of curved oil guide faces connected with the oil removing arrangements, oil is collected out of the space between the support construction 11 and the mantle 12 of the roll, after which the direction of flow of the oil is turned into an axial direction. After this, the oil can be passed to the ends of the roll, from which it is removed by means of oil removing syphons. A second possibility is to pass the oil into the central portion of the roll and from there further out of the roll. In both cases, attempts are made to take advantage of the kinetic energy of the oil as efficiently as possible when the oil is passed out of the roll.

In the following, the patent claims will be given, and the details of the invention can show variation within the scope of the inventive idea defined in said claims and differ from what has been stated above by way of example only.

It is understood that the invention is not limited to the particular construction and arrangement of parts herein illustrated and described, but embraces all such modified forms thereof as come within the scope of the following claims.

We claim:

1. An arrangement for removing oil in an roll having a stationary support construction with an outer face of the support construction and a roll mantle revolving around said construction, which mantle is supported from an inner face of the roll mantle on the support construction by at least one hydraulically loaded loading member, by which the roll mantle is loaded or shifted and loaded against a backup roll that forms a nip with the roll, wherein the oil removing arrangement comprises at least one oil collecting equipment which has been fitted in a space between the outer face of the support construction, wherein the improvement comprises:

the oil collecting equipment comprising at least a first oil guide plate that has a curved portion in the direction of the roll circumference and which is spaced from the inner face of the mantle, and wherein a flow passage is formed between the first oil guide plate and the outer face of the support construction along which flow passage oil that collides against the loading members is passed into oil guide arrangements passing out of the roll.

2. The apparatus of claim 1 wherein the roll mantle is additionally supported at its inner face on the support construction by support members positioned at an opposite side of the support construction in relation to the loading member and wherein oil that collides against the loading members or the support members is thereby passed into the oil guide arrangements passing out of the roll.

3. The apparatus of claim 2 wherein the oil collecting equipment comprises a first oil collecting equipment, and further comprising a second oil collecting equipment, also positioned between the inner face of the roll mantle and the outer face of the support construction so that the first oil collecting equipment is placed before the at least one loading member, as viewed in the sense of rotation of the roll mantle, and the second oil collecting equipment is placed after the support members, as viewed in the sense of rotation of the roll mantle, such that oil is collected by the first oil collecting equipment when the roll operates as the lower roll in a nip, while the sense of rotation of the roll mantle is counterclockwise, and by the second oil collecting equipment when the roll operates as the upper roll in a nip, while the sense of rotation of the roll mantle is clockwise.

4. The apparatus of claim 2 wherein between the inner face of the roll mantle and the outer face of the support construction, at one side of the support construction in relation to a nip plane, two oil collecting equipments are positioned, and at the opposite side of the support construction, two oil collecting equipments are positioned, so that, of the oil collecting equipments placed at each side of the nip plane, one equipment is placed at the side of the at least one loading member and the other one at the side of the support members, in which case the collecting of oil operates in all roll positions and with both senses of rotation of the roll mantle.

5. The apparatus of claim 1 wherein the oil collecting equipment first oil guide plate has a straight forward edge spaced from the loading members, and a curved rear edge at which the distance of a middle portion from the forward edge is shorter than a distance of lateral portions from the forward edge, the rear edge being joined to the forward edge by straight lateral edges and the oil collecting equipment further comprising:

radial side walls connected with the lateral edges of the first oil guide plate and directed towards the support construction, the side walls extending from the forward edge of the oil guide plate to a positioned spaced from the first oil guide plate rear edge to define oil drain openings at rear corners of the oil collecting equipment, and a curved rear wall which extends from the rear edge of the oil guide plate towards the support construction, the flow passage being defined between the oil collecting equipment and the outer face of the support construction, along which flow passage the oil present in the roll is guided through the oil drain openings provided at the rear corners of the oil collecting equipment to oil removing syphons placed in end parts of the roll and, and carried through the syphons into a cental portion of the roll, from where the oil is passed by means of an axial oil drain duct further out of the roll.

6. The apparatus of claim 5 wherein the roll operates as a lower roll in a nip, and the oil collecting equipment is placed before the at least one loading member, as viewed in the sense of rotation of the roll mantle, such that oil that collides against the at least one loading member flows onto the outer face of the support construction and splashes back from the at least one loading members to be collected into the oil collecting equipment.

7. The apparatus of claim 1 wherein the roll operates as an upper roll in a nip, and the mantle is further supported on the support construction by support members placed opposite to the at least one loading member, and the oil collecting equipment is placed ahead of the support members, as viewed in the sense of rotation of the roll mantle, such that oil that collides against the support members flows onto the outer face of the support construction and splashes back from the support members and is collected into the oil collecting equipment.

8. The apparatus of claim 1 wherein the oil collecting equipment comprises:

a bottom plate fitted against the outer face of the support construction;

a curved partition wall attached to an edge of the bottom plate;

a plurality of ducts extending through the bottom plate; and an outer wall attached to the ducts, which outer wall is provided with a portion parallel to the bottom plate, with a subsequent U-section portion, and with a subsequent curved portion, which extends into a space between the inner face of the roll mantle and the curved partition wall.

9. The apparatus of claim 8 wherein the oil collecting equipment is placed before the at least one loading member, as viewed in the sense of rotation of the roll mantle, so that a forward edge of the curved portion of the outer wall of the oil collecting equipment extends up to a distance from the at least one loading member, such that oil that collides against the at least one loading member and flows onto the outer face of the support construction and that splashes back from the loading members is collected into the oil collecting equipment.

10. The apparatus of claim 9 wherein when the roll operates as the lower roll in a nip, a flow passage is formed between the curved portion of the outer wall of the oil collecting equipment and the curved partition wall, along which flow passage the oil that collides against the at least one loading member and flows onto the outer face of the support construction and that splashes back from the at least one loading member is passed into the oil collecting equipment and further along the ducts in the oil collecting equipment by means of radial oil guide ducts into the central portion of the roll, from where the oil is passed out by means of an axial oil drain duct.

11. The apparatus of claim 9 wherein the roll mantle is additionally supported at its inner face on the support construction by support members positioned at an opposite side of the support construction in relation to the loading member, and wherein when the roll operates as the upper roll in a nip, a flow passage is formed between the bottom plate and the portion of the outer wall parallel to the bottom plate, along which flow passage oil that collides against the support members and flows along the outer face of the support construction and that splashes back from the support members is passed into the oil collecting equipment and further, along the ducts in the oil collecting equipment, by means of radial oil guide ducts into the central portion of the roll, from which the oil is passed out by means of an axial oil drain duct.

12. The apparatus of claim 8 wherein the oil collecting equipment comprises a first oil collecting equipment, and further comprising a second oil collecting equipment, also positioned between the inner face of the roll mantle and the outer face of the support construction, and wherein the first oil collecting equipment is placed at one side of the support construction, in relation to a nip plane, and the other oil collecting equipment is placed at an opposite side of the support construction, and wherein the outer walls of both oil collecting equipments extend up to a distance from the at least one loading member, such that the collecting of oil operates in all positions of the roll and with both senses of rotation of the roll mantle.

13. The apparatus of claim 1 further comprising an oil guide fitted in an angular space between the at least one loading member and a top face of the support construction before the loading members, as viewed in the sense of rotation of the roll mantle, the oil guide having an inclined or curved oil guide face along which the oil colliding against the loading members is guided into the oil collecting equipment.

14. The apparatus of claim 1 wherein the cross-sectional form of the support construction is substantially I-shaped, and wherein the oil collecting equipment is positioned in a space defined between the outer face of the support construction and the inner face of the roll mantle, which oil collecting equipment further comprises an oil guide plate, in which there are a curved portion and a guide portion following said curved portion after a bend, in which connection a flow passage is formed between the curved portion of the oil guide plate and the inclined portion of the top face of the support construction, along which flow passage the oil present in the roll can be passed onto the guide portion of the oil guide plate and along said plate portion further into an oil collecting trough fitted in the support construction, from which trough the oil is removed by means of an oil drain pipe into an axial oil drain duct and along it further out of the roll.

15. The apparatus of claim 14 wherein the oil collecting equipment is placed after the at least one loading member, as viewed in the sense of rotation of the roll mantle, such that oil that collides against the at least one loading member and flows along the top face of the support construction is collected into the oil collecting equipment.

16. An arrangement for removing oil in an roll, comprising:
   a roll having a stationary support construction with an outer face and a roll mantle revolving around said construction, wherein the mantle has a inner face, and the mantle is supported from the inner face on the support construction by at least one hydraulically loaded loading member which loads or shifts and loads the roll mantle against a backup roll that forms a nip with the roll; and
   at least one oil collecting equipment positioned in a space between the outer face of the support construction and the inner face of the roll mantle, and which is supported against the support construction, the at least one oil collecting equipment having an outer wall curved in the direction of the circumference and fitted between the outer wall and the support construction, which outer wall and inner wall extended across an axial direction, the outer and inner wall having lateral edges which are interconnected by radial side walls, and rear edges which are attached to an axial oil guide duct, in which there are openings opening into the interior of the oil collecting equipment, such that oil gathered on the inner face of the roll mantle is guided through an inlet opening formed by the outer and inner face walls of the oil collecting equipment into the oil collecting equipment and from a rear part of the oil collecting equipment further into an axial oil guide duct and from it further through radial oil guide ducts, into a central portion of the roll, from which the oil is passed out through an axial oil dram duct.

17. The apparatus of claim 16 wherein an interior space is defined in the oil collecting equipment between the outer wall and the inner wall, the interior space being divided into two parts by a first oil guide plate and a second oil guide plate, which have a common starting point at a forward edge of the oil collecting equipment, from which common starting point the first oil guide plate is directed in arc shape towards a first rear corner of the oil collecting equipment, and the second oil guide plate is directed from the common starting point in arc shape towards a second rear corner of the oil collecting equipment, the axial oil guide duct being provided with openings at the rear corners of the oil collecting equipment, through which openings the oil guided by the oil guide plates and by the side walls is transferred into the axial oil guide duct in the oil collecting equipment.

18. The apparatus of claim 16 wherein the oil collecting equipment is placed after the at least one loading member, as viewed in the sense of rotation of the roll mantle, so that the oil guide duct connected with the oil collecting equipment is placed on a neutral axis of the roll.

19. The apparatus of claim 16 wherein the oil collecting equipment comprises a first oil collecting equipment, and further comprising a second oil collecting equipment also positioned between the inner face of the roll mantle and the outer face of the support construction, wherein the first oil collecting equipment is placed after the at least one loading member, in relation to the sense of rotation of the roll mantle, and the second oil collecting equipment is placed before the at least one loading member, in relation to the sense of rotation of the roll mantle, in which case the oil guide ducts connected with the oil collecting equipments are placed on a neutral plane of the roll at opposite sides of the support construction.

20. The apparatus of claim 19 wherein each oil collecting equipment is supported on the support construction by an actuator such that supported oil collecting equipment and the connected oil guide duct can be pivoted around the central axis of the oil guide duct between an outer position, in which the oil collecting equipment collects oil, and an inner position, in which the oil collecting equipment does not collect oil.

21. A roll with oil removing apparatus comprising:
   a stationary support construction having an outer face;
   a roll mounted to revolve about the stationary support construction, the mantle having an inner face which is engaged and supported by at least one hydraulically loaded loading member which extends from the stationary support construction to load the roll mantle against a backup roll forming a nip with the roll mantle;
   at least one oil collecting equipment positioned in a space defined between the outer face of the support construction and the inner face of the roll mantle, the at least one oil collecting equipment being supported by the support construction, the at least one oil collecting equipment comprising at least a first guide plate that comprises at least a curved portion in the direction of the circumference of the roll mantle and spaced from the inner face of the roll mantle, wherein a flow passage is defined between the first oil guide plate and the outer face of the support construction; and oil guide passages passing out of the roll which communicate with the flow passage, such that oil that collides against the at least one loading member is passed into the oil guide arrangements for passage out the roll.

22. The apparatus of claim 21 wherein the first oil guide plate has a forward edge, and two lateral edges extending from the forward edge to a rear edge spaced from the forward edge, wherein a rear wall extends radially inwardly from the rear edge, and radial side walls extend radially inwardly from the lateral edges, the lateral edges extend from the forward edge up to a distance from the rear edge of the oil guide plate to define oil removing openings at rear corners of the first oil guide plate.

23. The apparatus of claim 21 wherein the oil collecting equipment comprises:

a bottom plate fitted against the outer face of the support construction;

a curved partition wall attached to an edge of the bottom plate;

a plurality of ducts extending through the bottom plate; and wherein the first oil guide plate is a portion of an outer wall attached to the ducts, which outer wall is provided with a portion parallel to the bottom plate, with a subsequent U-section portion, and with a subsequent curved portion, which extends into a space between the inner face of the roll mantle and the curved partition wall.

* * * * *

UNITED STATES PATENT AND TRADEMARK OFFICE
CERTIFICATE OF CORRECTION

PATENT NO.      : 6,443,880 B2
DATED           : September 3, 2002
INVENTOR(S)     : James Blais et al.

It is certified that error appears in the above-identified patent and that said Letters Patent is hereby corrected as shown below:

Column 7,
Line 20, "construction 1" should be -- construction 11 --

Column 10,
Line 48, "11." should be -- 11 --
Line 61, "construction 1" should be -- construction 11 --

Column 12,
Line 43, "construction," should be -- construction and the inner face of the roll mantle, and which is supported on the support construction, --

Column 15,
Line 36, "in an" should be -- in a --
Line 52, "circumference" should be -- circumference and an inner wall curved in the direction of the circumference --
Line 54, "extended" should be -- extend --
Line 55, "wall" should be -- walls --
Line 61, "inner face walls" should be -- inner walls --

Signed and Sealed this

Twenty-sixth Day of November, 2002

*Attest:*

*Attesting Officer*

JAMES E. ROGAN
*Director of the United States Patent and Trademark Office*